Sept. 15, 1931. R. MOURE 1,823,159
BAKER'S PEEL
Filed Nov. 6, 1928
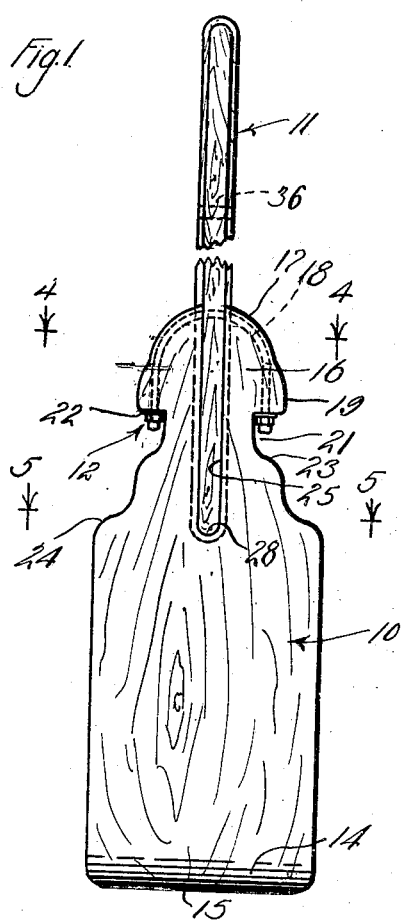
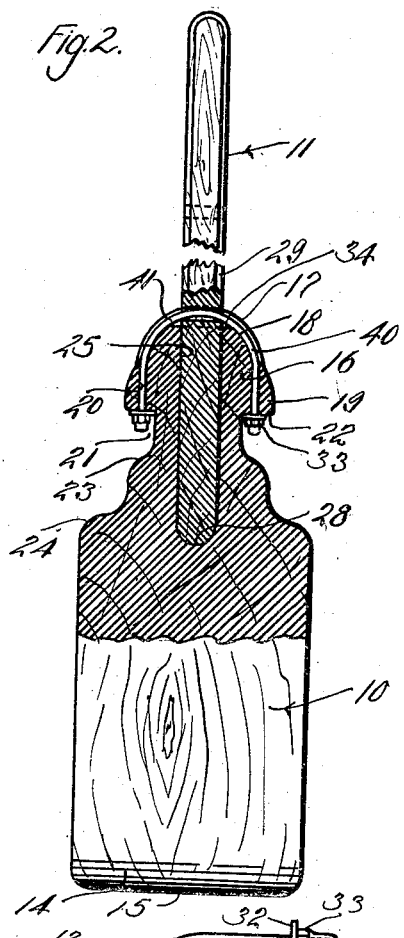
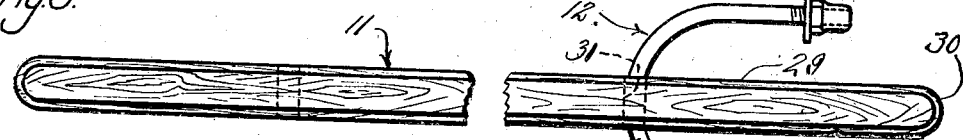
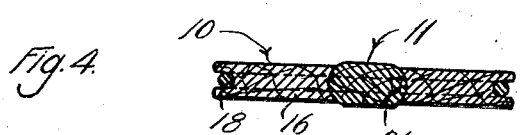
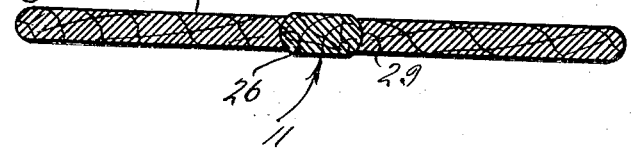
Inventor
Ramiro Moure
by
His Attorney Patented Sept. 15, 1931

1,823,159

UNITED STATES PATENT OFFICE

RAMIRO MOURE, OF LOS ANGELES, CALIFORNIA, ASSIGNOR TO A. BACKUS JR. & SONS, OF DETROIT, MICHIGAN, A CORPORATION OF MICHIGAN

BAKER'S PEEL

Application filed November 6, 1928. Serial No. 317,609.

This invention has to do with a baker's peel being a device for handling bread, or the like, in an oven, and a general object of the invention is to provide a simple, effective and improved device of this character.

Bakers' peels are used in putting in and withdrawing loaves of bread and other bakers' products to and from ovens. These devices are generally formed of wood and have comparatively long handles with flat blades detachably mounted on one end. Light material and light construction are desirable, in fact necessary, features of bakers' peels, and in practice it is difficult to produce peels having these features and capable of withstanding much use. It is the general practice in the manufacture of bakers' peels to form a slot or notch in the end of the blade and fix the end of the handle in the notch by means of bolts extending through the blade and the portion of the handle in the slot. With this form of connection between the blade and handle, the bolts soon enlarge the holes in the wood and the blade become loose on the handle.

It is an object of this invention to provide a baker's peel of simple, practical and durable construction.

Another object of the invention is to provide a baker's peel having a reversible handle.

A further object of the invention is to provide a bolt connection for the blade and handle of a baker's peel having no exposed metal parts to accidentally touch an operator.

Another object of the invention is to provide a connection for the handle and blade of a baker's peel which operates to clamp the parts together longitudinally and also transversely.

It is another object of the invention to provide a device of the character mentioned in which the handle and the blade fit or mesh together so that the blade cannot move laterally relative to the handle when the two are assembled.

Another object of the invention is to provide a device of the character mentioned having a single bolt member acting to clamp the blade and handle together laterally as well as transversely.

A further object of the invention is to provide an improved bolt member for connecting the blade and handle of a baker's peel.

Other objects and features of my invention will be best and more fully understood from the following detailed description of a typical form and application of the invention, throughout which description I make reference to the accompanying drawings, in which:

Fig. 1 is a plan elevation of the device provided by this invention. Fig. 2 is a view similar to Fig. 1 with certain parts broken away to show in section. Fig. 3 is an enlarged detailed view of the handle assembly. Fig. 4 is an enlarged detailed sectional view taken as indicated by line 4—4 on Fig. 1, and Fig. 5 is an enlarged detailed sectional view taken as indicated by line 5—5 on Fig. 2.

The baker's peel provided by this invention includes, generally, a blade 10, a handle 11 for the blade, and means 12 for detachably connecting the blade to the handle. The blade 10, which may be of any shape, size or proportioning common to bakers' peels, is preferably formed of wood, the grain of the wood extending longitudinally of the peel. The top and bottom sides of the blade generally converge toward the outer end of the blade. The outer end 14 of the body 13 of the blade is tapered or bevelled, forming a narrow edge 15 which permits the blade to be readily slipped under the bread or objects to be handled. The inner end portion 16 of the blade is somewhat narrower than the body 13 and is rounded at its outer or projecting end as shown at 17 in Figs. 1 and 2. The edge 17 of the rounded end portion 16 is provided with a central longitudinal groove 18. Lugs or ears 19 project from each side of the outer end portion 16. Openings 20 extend through the ears longitudinally of the blade and register with the ends of the groove 18. Notches 21 are provided in the two edges and the end portion 16 immediately adjacent the ears 19 and form shoulders 22 disposed transversely of the blade and faced toward the outer end of the blade.

The sides 23 of the notches opposite the shoulders 22 may be rounded or curved as shown in the drawings. Rounded corners 24 are provided between the reduced end portion 16 and the body of the blade.

A notch 25 extends longitudinally into the end portion 16 of the blade to a point about at the point of connection of the body 13 and end portion 16. The notch 25 is centrally located between the edges of the blade. The sides or walls 26 of the notch are routed or longitudinally grooved as shown throughout the drawings. In practice the grooves in the two walls 26 may be formed simultaneously by a suitably shaped revolving cutter. The inner end 28 of the notch is routed or grooved the same as the sides and may be formed with the same cutter.

The handle 11 which is preferably formed of wood, may be of any desired length and is of uniform width and thickness. The handle is of the same width as the notch. The edges 29 of the handle are parallel and convex, or rounded, to correspond to the configuration of the side walls 26 of the notch. The ends 30 of the handle are correspondingly rounded to fit the end 28 of the notch.

The blade 10 is mounted on the end portion of the handle with the handle extending into the notch, and as the edges 29 of the handle have the same configuration as the walls 26 of the notch, the blade is held from all lateral movement relative to the handle. The rounded end 30 of the handle fits in the groove 28 at the end of the notch and aids in preventing movement of the blade on the handle.

The means 12 for detachably connecting the blade 10 and the handle includes, generally, a U-shaped bolt 40. The arms of the U bolt extend through the openings 20 and the curved connecting portion 41 of the bolt is carried or seated in the groove 18. The groove 18 is deep enough so that the portion 14 is completely countersunk in the end portion of the blade. The U bolt 40 passes through an opening 31 formed transversely in the handle to register with the groove 18 when the handle is seated in the notch. The threaded outer ends of the arms of the U bolt project from the openings 20 into the notches 21. Nuts 33 are screw threaded on the ends of the arms and clamp against washers 32 which bear against the shoulders 22. The nuts 33 are preferably of the type having a rounded shield or protecting part, and are provided to protect the screw threaded ends of the bolt 40. The groove 18 has a flattened or deepened portion 34 at the point where the handle enters the blade part 16. This allows the bolt 40 a certain amount of longitudinal movement relative to the blade as the nuts 33 are made tight on the arms of the bolt. The opening 31 in the handle is elongated sufficiently to permit the curved part of the bolt 40 to pass through it. An opening 36 similar to the opening 31 may be provided at the outer end of the handle in the same relative location as the hole 31, to permit the handle to be reversed. When the peel is assembled, the U bolt 40 is placed on the opening 31 and the blade is slipped on the handle, while the ends of the bolt enter the openings 20.

The construction of the above described peel is very durable and practical. The bolt 40 not only holds the blade 10 on the handle 11 longitudinally, or by drawing the two together longitudinally, but also clamps the end portion 16 laterally on the part of the handle in the notch 25. The washers 32 and the curved part 41 of the bolt bear against the end grain of wood forming the blade 10. The end grain of the wood is capable of withstanding more pressure and resists more wear than the crossgrain, and for this reason the bolt 40 will not become loosened with use as readily as bolts tightened against the crossgrain. The convex edges 29 of the handle fit within the grooved walls 26 of the notch and prevent the blade from moving on the handle. The handle having rounded edges along its entire length, is adapted to be gripped with ease, and in the event of breakage, any part of the handle will fit within the notch. Another important feature of the device provided by this invention is the fact that there are no metal parts exposed on the edges of the blade.

A further feature of the invention is the simple construction which permits of the handle and blade being easily and quickly assembled or detached, thus effecting a saving of time.

Having described only a typical preferred form of my invention, I do not wish to limit myself to the specific details set forth, but wish to reserve to myself any changes or variations that may appear to those skilled in the art or fall within the scope of the following claims:

Having described my invention, I claim:

1. A baker's peel including, a blade having a longitudinal notch at one end and a longitudinally facing shoulder at the edge of the blade at each side of said notch, a handle extending into the notch, a U bolt having its ends projecting from said shoulders and its central transverse portion extending through an elongated opening in the handle, and nuts threaded on the said ends of the U bolts clamping the handle inwardly in the notch and the blade against the sides of the portion of the handle in the notch.

2. A baker's peel including, a blade having a notch in one end, a handle of uniform cross section throughout its length having its end portion extending into the notch, and means securing said portion in the notch, said means including, a U bolt having its curved central portion countersunk in the end of the blade, and its side parts extending through the blade at opposite sides of the notch and substantially parallel to the notch.

3. A baker's peel of the character described including, a blade having a longitudinal notch at one end and a transverse notch at each side, the transverse notches forming longitudinally facing shoulders, a handle having its end portion extending into the said longitudinal notch, a U bolt having its central portion abutting the end of the blade and extending through the handle, and the ends of its side parts projecting from said shoulders and nuts on the said ends of the U bolt.

4. A baker's peel including a blade having shoulders facing longitudinally of the blade and having a longitudinal notch between the shoulders, a handle extending into the notch, a U-bolt having its central transverse portion countersunk in a longitudinal extremity of the blade and passing through an opening in the handle and having its side arms projecting from the said shoulders, and nuts on the side arms engaging the shoulders.

5. A baker's peel including a blade having longitudinally facing shoulders at its side edges and having a longitudinal notch with grooved walls between the shoulders, a handle fitting into the notch, a U-bolt having its central portion engaging a longitudinal extremity of the blade and passing through an opening in the handle, and having its side arms extending through openings in the blade to project from the shoulders, and clamping members on the side arms to engage the shoulders.

6. In a baker's peel, a blade having a longitudinal notch, a handle extending into the notch, and a U-bolt having its central portion engaging a longitudinal extremity of the blade and passing through an opening in the handle and having its side arms extending into longitudinally disposed openings in the blade to connect the handle with the blade.

7. In a baker's peel, a blade having a longitudinal notch, a handle extending into the notch, a U-bolt having its central transverse portion disposed transversely of the blade and extending through an opening in the handle and having its side arms extending through longitudinally disposed openings in the blade, and means on the side arms for clamping against the blade.

8. A baker's peel including a blade having longitudinally facing shoulders and having a longitudinal notch, a handle carried in the notch, a U-bolt having its central portion engaging a longitudinal extremity or end of the blade and passing through an opening in the handle and having its side arms extending through longitudinal openings in the blade to project from the shoulders, and nuts on the side arms to engage the shoulders.

9. A baker's peel including a blade, there being a notch extending longitudinally into the blade from its longitudinal extremity or end, a handle adapted to extend into the notch, the handle being of uniform configuration and size throughout its length, and a U-bolt to secure said handle in the notch, the bolt having its central portion clamped against the said extremity of the blade and extending through an opening in the handle.

10. A baker's peel including a blade having a reduced end portion with a rounded longitudinal extremity and having a shoulder on each side facing longitudinally of the blade, there being a notch extending longitudinally through the reduced portion from its curved extremity, a handle extending into the notch, a U-bolt having its curved central portion extending through an opening in the handle and engaging the said rounded extremity and having its side arms extending through longitudinal openings in the reduced portion to project from the shoulders, and nuts on the side arms to engage the shoulders.

11. A baker's peel including a blade having longitudinally facing shoulders and having a longitudinal notch, a handle carried in the notch, a U-bolt having its central portion engaging a longitudinal extremity or end of the blade and passing through an elongated opening in the handle and having its side arms extending through longitudinal openings in the blade to project from the shoulders, and nuts on the side arms to engage the shoulders.

12. A baker's peel including a blade having an elongated notch, the inner end of the notch being undercut, a handle extending into the notch having a reduced end to fit the undercut end of the notch, a U-bolt having its central portion passing through an opening in the handle, and nuts on the side parts of the bolt reacting against the blade to urge the handle inwardly toward the center of the blade.

In witness that I claim the foregoing I have hereunto subscribed my name this 18th day of October, 1928.

RAMIRO MOURE.